3,020,263
POLYESTER RESINS
Talmage D. Foster, Jr., Tornado, W. Va., assignor to Union Carbide Corporation, a corporation of New York
No Drawing. Filed Oct. 31, 1958, Ser. No. 770,928
10 Claims. (Cl. 260—67)

This invention relates to a novel class of synthetic resinous polyesters which are useful in coating and molding applications, and to a process for their preparation. In one of its aspects, this invention relates to a class of spirobi(meta-dioxane) polyester resins which are water-soluble and adapted upon simple heat treatment to yield tough, hard, shaped articles such as films, sheets and molded forms which are infusible, and which are insoluble in common solvents such as water, acetone, methanol, ethanol, dioxane, diethyl ether, benzene, pentane, hexane, dimethylformamide, and the like.

The resinous polyesters of this invention are produced by a process which comprises (1) forming an intermediate polyester condensate by heating and condensing at a temperature within the range between about 125° C. and 225° C. a mixture comprising (a) a spirobi(meta-dioxane) compound having the structure:

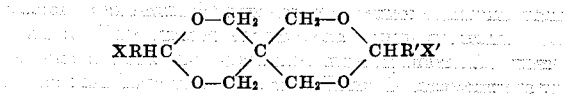

wherein R and R', respectively, designates a member of the class consisting of the divalent aliphatic radicals of the formula $C_nH_{2n}$ wherein $n$ is an integer from 2 to 18, and the divalent cyclohexane residue; and X and X', respectively, designate a member of the class consisting of the —$COOR^2$ radicals wherein $R^2$ designates a member of the class consisting of hydrogen and the alkyl radicals having one to fourteen carbon atoms; and (b) a member of the class consisting of the alkanediols of the structure $C_mH_{2m}(OH)_2$ where $m$ is in integer from 2 to 10 and the polyoxyalkylene diols of the structure $HOCH_2CHR^3(OCH_2CHR^3)_pOH$ where $R^3$ is of the class consisting of hydrogen and the methyl radical, and $p$ is an integer from 1 to 3, the said diol and spirobi(meta-dioxane) compound being reacted in the range of molar ratios of from 1:1 to 5:1, said diol having a boiling point higher than that of the by-product $R^2OH$, removing the by-product $R^2OH$ as it is formed, and continuing the heating until substantially all formation and evolution of the $R^2OH$ has ceased; and (2) treating said intermediate polyester condensate at a temperature within the range between about 60° C. and 100° C. with between about 5 percent and 100 percent by weight of water and with between about 0.8 percent and 27 percent by weight of formaldehyde, based on the weight of intermediate polyester condensate, in the presence of a catalytic quantity of acid for a period of time between about one and six hours.

The resinous polyesters of this invention are viscous, clear liquids in bulk. They yield tough, flexible films when shaped and heat-cured as hereinafter described. Solutions of the polyesters in water or organic solvents are useful coating and impregnating compositions, yielding protective coatings which adhere firmly and can be rendered infusible, and insoluble in subtsantially all of the common organic solvents.

In a preferred embodiment of this invention particularly adapted for producing aqueous solutions of the novel class of resinous polyesters of this invention, a process is employed which comprises (1) forming an intermediate polyester condensate by heating and condensing at a temperature within the range between about 125° C. and 225° C. in an inert atmosphere a mixture comprising (a) a spirobi(meta-dioxane) compound having the structure:

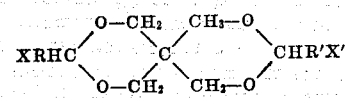

wherein R and R', respectively, designates a member of the class consisting of the divalent aliphatic radicals of the formula $C_nH_{2n}$ wherein $n$ is an integer from 2 to 18, and the divalent cyclohexane residue; and X and X', respectively, designate a member of the class consisting of the —$COOR^2$ radicals wherein $R^2$ designates a member of the class consisting of hydrogen and the alkyl radicals having one to fourteen carbon atoms; and (b) a member of the class consisting of the alkanediols of the structure $C_mH_{2m}(OH)_2$ where $m$ is an integer from 2 to 10 and the polyoxyalkylene diols of the structure $HOCH_2CHR^3(OCH_2CHR^3)_pOH$ where $R^3$ is of the class consisting of hydrogen and the methyl radical, and $p$ is an integer from 1 to 3, the said diol and spirobi(meta-dioxane) compound being reacted in the range of molar ratios of from 1:1 to 5:1, said diol having a boiling point higher than that of the by-product $R^2OH$, removing the by-product $R^2OH$ as it is formed, and continuing the heating until substantially all formation and evolution of the $R^2OH$ has ceased; and (2) hydrolyzing said intermediate polyester condensate with between about 5 percent and 100 percent by weight of water in the presence of between about 0.8 percent and 27 percent by weight of formaldehyde and between about 0.01 percent and 5.0 percent by weight of acid catalyst, based on the weight of intermediate polyester condensate, at a temperature within the range between about 60° C. and 100° C. until a homogeneous solution is formed.

In reaction stage (1) of the process, the condensation of the diol and the spirobi(meta-dioxane) compound to produce the intermediate polyester condensate is conducted at a temperature between about 125° C. and 225° C., with the preferred temperature range being between about 150° C. and 175° C., and the molar ratio of diol to spirobi(meta-dioxane) compound is maintained in the range between about 1:1 and 5:1, with the preferred molar ratios being between about 1.1:1 and 1.5:1. When a spirobi(meta-dioxane) diacid is one of the reactants any of the well-known acidic polyesterification catalysts can be used, such as sulfuric acid, diethyl sulfate, methanesulfonic acid, toluenesulfonic acid, zinc chloride, and the perfluoroalkanoic acids. The reaction of a spirobi(meta-dioxane) diester with the diol is catalyzed by any of the usual ester exchange catalysts, such as the foregoing and the tetraalkyl titanates, dialkyl phosphates, litharge, alkali metal alcoholates and hydroxides, alkaline earth metal oxides, antimony trioxide, boron trifluoride, cadmium, magnesium and zinc salts of alkanoic acids such as acetic and propanoic acids, and metals such as lithium, potassium, sodium, magnesium, zinc, cadmium, aluminum, manganese, iron, nickel and the like.

The tetra lower alkyl titanates are outstandingly effective as ester exchange catalysts in reaction stage (1) of the process. The catalyst can be used effectively in concentrations of 0.01 percent to 5% by weight based on the total weight of reactants, although concentrations of catalyst of from around 0.1 percent to around 0.5 percent by weight are preferred. The initial condensation of polyesterification reaction stage (1) is conducted in an essentially oxygen-free atmosphere of gas which is inert to the reaction conditions, such as nitrogen, carbon dioxide, methane, helium, argon, or mixtures of these gases; and the by-product alkanol (when using a diester reactant) preferably is removed by sparging with an inert gas, at atmospheric or other pressure.

This initial polyesterification or condensation stage (1) is terminated when substantially all of the by-product alkanol (or water in the case where a diacid reactant is used), together with most of any excess diol reactant, preferably around 90 percent of the excess, has been removed during the inert gas sparging operation. Usually this point can be determined visually by observing when a marked increase in the viscosity of the reaction mixture occurs. The precise limits of viscosity change varies from one reaction mixture to another. In general the intermediate polyester condensates of reaction stage (1) are quite viscous liquids. They are soluble in such organic solvents as ethyl acetate, diethyl ether, dioxane, benzene, acetone, methyl ethyl ketone and other ketones, and carbon tetrachloride. They are insoluble in water and in aliphatic hydrocarbons such as pentane, hexane, heptane and cyclohexane.

In reaction stage (2) of the process, the treatment of the intermediate polyester condensate product of the first reaction step with water (i.e., the partial hydrolysis of the intermediate polyester condensate) in the presence of formaldehyde is conducted at a temperature between about 60° C. and 100° C., with the preferred temperature range being between about 75° C. and 95° C. The total quantity of water advantageously employed can vary between about 5 percent by weight and 100 percent by weight, based on the weight of intermediate polyester condensate, with between about 5 and 15 weight percent of water being the preferred amount.

The quantity of formaldehyde employed can vary between about 0.8 percent by weight and 27 percent by weight, based on the weight of intermediate polyester condensate, with between about 2 and 18 weight percent of formaldehyde being the preferred weight range. The formaldehyde can be introduced into the reaction medium, in the form of paraformaldehyde, or as a formalin solution, i.e., a 37 percent aqueous solution of formaldehyde. When formalin is employed, the weight of water in the solution is calculated as a portion of the total water added for the hydrolysis reaction. Formaldehyde is the preferred modifier compound employed in the compositions of this invention because it is readily available and because it is highly reactive. However, other low molecular weight aldehydic modifier compounds can be used instead of formaldehyde, if desired, such as glyoxal, acetaldehyde, propionaldehyde, and the like.

The weight of formaldehyde, or other aldehydic modifier compounds employed, can also be expressed in terms of mole ratios relative to the quantity of spirobi(meta-dioxane) diester or diacid reacted. Between about 0.1 and 2.0 moles of formaldehyde can be employed for each mole of spirobi(meta-dioxane) diester or diacid initially charged for the formation of intermediate polyester condensate in reaction stage (1). The modification effected in the intermediate polyester condensate by interaction with formaldehyde is characterized in the final cured resin by increased toughness and hardness, and by increased resistance to moisture and solvents as compared with a polyester resin prepared in the same manner but not modified with formaldehyde. The effect is usually more pronounced as the amount of formaldehyde is increased.

Reaction stage (2) can be conducted with an initial stoichiometric quantity of water that is the calculated equivalent of the portion of acetal groups that is to be hydrolyzed, then an additional quantity of water can be added to form a casting solution of desired consistency. An organic solvent such as tetrahydrofuran can be employed to form the casting solution rather than water but all the advantages of an aqueous vehicle over a noxious, flammable organic solvent vehicle are sacrificed. In an alternative method, the full amount of water that is required for the hydrolysis and for forming a casting solution is added as the initial charge and an aqueous solution of the modified, partially hydrolyzed spirobi(meta-dioxane) polyesters is obtained directly as the final product of the process.

The partial hydrolysis of the intermediate polyester condensate with water and the modification of the polyester with formaldehyde in reaction stage (2) can be performed satisfactorily in a reaction time varying within the range between about one and six hours. It is preferred, however, in the practice of this invention to conduct reaction stage (2) in the presence of a catalytic quantity of acid, e.g., between about 0.01 percent and 2.0 percent by weight of an acid catalyst, based on the weight of intermediate polyester condensate, at a temperature between about 75° C. and 95° C. until a homogeneous solution is formed. One main advantage of this preferred reaction stage (2) method is that the observed formation of a homogeneous solution during the reaction is an excellent indication that the intermediate polyester condensate has been sufficiently hydrolyzed and modified to provide one of the resinous polyesters of this invention.

Among the acids which can be employed to catalyze reaction stage (2) of the process are mineral acids such as sulfuric acid, hydrochloric acid, phosphoric acid, and the like; acid salts such as sodium and potassium acid sulfate, zinc chloride, and the like; Lewis acid boron derivatives such as boron trifluoride, boron trifluoride etherate, and the like; and organic acid derivatives such as methanesulfonic acid, p-toluenesulfonic acid, and the like. The preferred amount of acid catalyst employed in reaction stage (2) is between about 0.1 and 0.3 percent by weight, based on the weight of intermediate polyester condensate.

In the process described hereinabove for producing the novel resinous polyesters, it is believed that the intermediate polyester condensate of reaction stage (1) is a linear polyester containing recurring spirobi(meta-dioxane) groups, and that the modification effected by the hydrolytic conditions of reaction stage (2) in the presence of aldehydic modifier compounds comprises scission of spirobi(meta-dioxane) rings at the acetal positions with the formation of hydroxyl groups, and subsequent interaction of the said hydroxyl groups with the aldehydic modifier compounds. The water solubility of a resinous polyester increases as the number of hydroxyl groups formed by acetal hydrolysis increases. The mechanism of reaction proposed for the hereindescribed process is merely theoretical. Other theories or reasons may equally well explain the true course of the process reactions.

The conversion of the water-soluble polyesters to a water- and organic solvent-insoluble and infusible form can generally be effected by heating the former to temperatures within the range between about 125° C. and 275° C. under conditions favoring polymerization and cross-linking of the water-soluble polyesters. This phase of the process can be conveniently carried out under vacuum at lower temperatures for the elimination of water, excess diol and other volatile materials not a substantive part of the polyester resin.

When a polyester resin to be converted is in the form of a film, sheet, layer, filament, or other article that is relatively thin in at least one of its dimensions, curing temperatures in the range between about 125° C. to 175° C. are commonly used. The higher conversion temperatures up to about 275° C. are useful when treating an unshaped large mass of polyester resin. In this case the resultant mass of cross-linked resin can be pulverized and converted to a gel by grinding with a swelling agent such as dimethylformamide. The gel can be applied to paper or a textile fabric in a calendering process to yield an adherent coating useful in the manufacture of laminated articles.

The final cross-linking stage in general is complete when the shaped article or the bulk product is free from tackiness and, in the case of the cooled film, has a relatively hard, firm surface. The products are solid cross-linked infusible resins which are insoluble in water and in such common solvents as benzene, toluene, acetone, methyl ethyl ketone and other ketones, diethyl ether, dibutyl ether, dioxane, β-butoxy-(2-ethoxy)ethanol and other ethers, pentane, hexane and other aliphatic hydrocarbons, and the acetate and propionate esters of B-ethoxyethanol, β-methoxyethanol, β-ethoxy-(2-ethoxy) ethanol, β-butoxy-(2-ethoxy)ethanol and the like. The cured resins are slightly softened by dimethylformamide.

Shaped articles of the polyester resins heat-cure to hard, glossy, infusible, solvent-resistant coatings in a short period of time. The polyester resins heat-cure to a tack-free condition in less than one hour at temperatures between about 125° C. and 150° C. This curing time is considerably less than is required for articles shaped from the intermediate polyester condensate produced by reaction stage (1) of the hereindescribed process. These latter resins require a curing time of between about two hours and twenty hours to produce hardness, flexibility, solvent-resistance and other desirable properties in the shaped polyester articles. Besides a shorter curing period, the novel hydrolysis and aldehyde-modified polyesters of this invention have the additional advantage over the reaction stage (1) intermediate polyesters in having greater resistance to moisture and solvents in their respective heat-cured forms. The polyesters of this invention also are superior to reaction stage (2) polyesters prepared in the same manner except for the exclusion of formaldehyde or other such aldehydic modifier compounds in that they are more resistant to solvent and moisture and they are tougher and harder in their respective heat-cured forms.

A particularly outstanding feature of the polyesters of this invention is their ability to be cast as a solution in an aqueous vehicle, and converted by heating to a cross-linked resin having excellent properties for protective coating and molding applications. The advantages of an aqueous vehicle over an organic solvent vehicle are numerous. Organic solvents are expensive and noxious, and they are hazardous to handle in normal coating and molding applications. In addition, a solvent recovery system is usually necessary when organic solvents are employed, and the clean-up problem is more difficult to manage.

The spirobi(meta-dioxane) diesters and diacids used as starting materials in the practice of this invention can be made by heating and condensing, in a reaction medium or diluent inert to the reactants, at temperatures within the range from 50° C. to about 150° C. in the presence of an acidic catalyst such as sulfuric acid, a β, γ, or δ-formyl alkanoic ester or mixtures thereof and pentaerythritol, neutralizing the resultant reaction mixture, filtering the neutralized mixture, and stripping the resultant filtrate of diluent and any unreacted formyl compound under high vacuum. The formyl alkanoic ester and the pentaerythritol can be reacted in a molar ratio range between 2:1 and 5 or more to 1, although a molar ratio around 2.2 to 1 is generally preferred.

Formyl alkanoic esters useful in that process include those having structures

wherein R designates a divalent aliphatic radical of the formula $C_nH_{2n}$ having two to eighteen carbon atoms, and the divalent cyclohexane residue, and X designates a member of the class consisting of the —$COOR^2$ radicals wherein $R^2$ designates a member of the class consisting of the alkyl groups having one to fourteen carbon atoms.

The diacid reactants used in the process of this invention are readily prepared from the corresponding diesters described above by saponifying the latter with water in the presence of an alkaline reagent such as sodium hydroxide, in a diluent such as methanol, at temperatures in the range from about 20° C. to about 100° C. The reaction mixture then is neutralized with a mineral acid such as sulfuric acid or hydrochloric acid; and the neutralized reaction mixture is filtered, and the insoluble diacid product is washed with water and dried.

Preferred spirobi(meta-dioxane) diesters and diacids of the structure

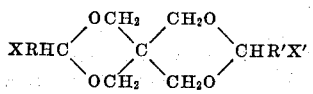

as defined include 3,9-bis(carbethoxyethyl)spirobi(meta-dioxane), 3,9 - bis(carbethoxypropyl)spirobi(meta-dioxane), 3,9 - bis(carbethoxycyclohexyl)spirobi(meta - dioxane), 3,9 - bis(carbethoxyendomethylenecyclohexyl) spirobi(meta-dioxane), 3,9-bis[8-carbmethoxy(1-n-nonyl) octyl]spirobi(meta-dioxane), and the like, and the respective diacid derivatives.

Preferred alkanediols of the structure $C_mH_{2m}(OH)_2$ as defined include di-primary alkanediols, primary-secondary alkanediols and di-secondary alkanediols, either branched-chain or straight-chain, such as 1,2-ethanediol, 1,2-propanediol, 1,3-butanediol, 1,4-butanediol, 2,4-pentanediol, 3-methyl-1,5-pentanediol, 1,3-hexanediol, 1,6-hexanediol, 1,10-decanediol, and the like. Preferred polyoxyalkylene diols of the structure

$HOCH_2CHR^3(OCH_2CHR^3)_pOH$ as defined include diethylene glycol, triethylene glycol, tetraethylene glycol, dipropylene glycol, tripropylene glycol, and the like.

The following examples will serve to illustrate particular embodiments of the invention.

Example 1

This example illustrates the preparation of a polyester without interaction with an aldehyde modifier, and the application and curing of films cast from an aqueous solution of the polyester.

The diester, 3,9 - bis(carbethoxyethyl)spirobi(meta-dioxane) (18 grams, 0.050 mole), was charged with ethylene glycol (3.4 grams, 0.055 mole) and tetrabutyl titanate (0.02 gram) to a tubular glass reaction vessel constructed with a sintered glass filter in the bottom and reacted for three hours at 175° C. The reaction vessel and contents were cooled to a temperature of 80° C., and water (0.9 gram, 0.05 mole) and methanesulfonic acid (0.04 gram) were added to the reaction mixture and the reactor was heated at a temperature of 80° C. to 88° C. with agitation being provided by nitrogen ebullition. An additional 15 grams of water were added during the heating period. At the end of two hours the reaction mixture became homogeneous, and the resulting aqueous solution, containing approximately 50 percent solids, was cooled to room temperature and cast as films on glass plates. The films were cured in a forced-air oven at a temperature of 150° C. After a thirty-minute cure the films were slightly tacky while hot but completely tack-free when cold, and after a one-hour cure the films were free of tackiness even when hot. The cured films were hard and glossy, and had excellent adhesion to the glass plates.

Example 2

This example illustrates the preparation of one of the polyesters of this invention modified with formaldehyde in the form of paraformaldehyde.

The diester, 3,9-bis(carbethoxyethyl)spirobi(meta-dioxane) (72.0 grams, 0.2 mole) was charged together with ethylene glycol (13.6 grams, 0.22 mole) and tetrabutyl titanate (0.08 gram) to a vessel similar to that described in Example 1 and reacted for a period of four hours at a temperature of 175° C. At the end of this reaction period evolution of ethanol was no longer evident. The reaction vessel and contents were cooled to a temperature of 80° C. and water (3.6 grams, 0.2 mole) and methanesulfonic acid (0.16 gram) were added to the reaction mixture and heating was continued for an additional two hours at a temperature of 80° C. Paraformaldehyde (1.5 grams, 0.05 mole), in a ratio of 0.25 mole per mole of diester starting material, and sulfuric acid (0.15 gram), 0.2 percent by weight based on the weight of polymer, were added to the reaction vessel and the mixture was heated at reflux (100° C.) for a period of 1.25 hours. After cooling to room temperature, the modified polymer was cast as films on glass plates. The films cured tack-free while hot after a one-hour cure at a temperature of 150° C. and they were hard and glossy and showed excellent adhesion to the glass.

*Example 3*

This example illustrates the preparation of a polyester of this invention modified with formalin (37 percent aqueous solution of formaldehyde).

The diester 3,9-bis(carbethoxyethyl)spirobi(meta-dioxane) (18.0 grams, 0.05 mole) was charged together with ethylene glycol (3.4 grams, 0.055 mole) and tetrabutyl titanate (0.02 gram) to a reaction vessel similar to that described in Example 1 and reacted for a period of three hours at a temperature of 175° C. At the end of this reaction period there was no further evolution of ethanol. The reaction vessel and contents were cooled to a temperature of 80° C., and formalin (1.0 gram), containing 0.37 gram (0.012 mole) of formaldehyde and 0.63 gram of water, and additional water (0.2 gram) were added to the reaction vessel. The reaction mixture was heated at a temperature of 80° C. for a period of one and one-half hours, then sulfuric acid (0.05 gram) was added and the mixture was heated for an additional two hours at the same temperature. The polymer was recovered from the reaction mixture and cast as films on glass plates. The films cured to a tack-free condition in two hours when dried in a forced-air oven at a temperature of 150° C.

The superior solvent resistance of films prepared from formaldehyde-modified polyesters as compared to films prepared from unmodified polyesters was demonstrated by contacting the films with various solvents for a period of ten to fifteen minutes at room temperature. The results are listed in the following table:

| Film | Hydrolyzed Polymer [1] | Formaldehyde Modified Polymer |
|---|---|---|
| Hours cure (150° C.) | 2 | 2 |
| Solvent: | | |
| Benzene | No effect | No effect |
| Dimethylformamide | Dissolves | Slightly softens |
| Diethylene glycol mono-butyl ether | Softens | No effect |
| Dioxane | Dissolves | Do. |
| Methanol | Slightly softens | Do. |

[1] Polymer prepared in the same manner as the polyesters of this invention except for modification with formaldehyde in reaction stage (2).

Further evidence of the improved solvent resistance of the formaldehyde-modified polyesters as compared with the unmodified polyesters was demonstrated by placing thin films of the respective polymers in boiling water for a period of approximately one-half hour. The unmodified polyester films softened rapidly and lost adhesion to the substrates while the formaldehyde-modified films were still hard and glossy at the end of the same period. Films of formaldehyde-modified polyesters and unmodified polyesters were exposed for six months to atmospheric moisture. The unmodified films gradually softened and became tacky, whereas the films modified with formaldehyde retained their original gloss and hardness over the same period of time.

What is claimed is:

1. A process for the production of resinous polyesters which comprises (1) forming an intermediate polyester condensate by heating and condensing at a temperature within the range between about 125° C. and 225° C. a mixture comprising (a) a spirobi(meta-dioxane) compound having the structure

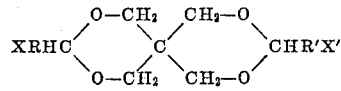

wherein R and R' designate members of the class consisting of the divalent aliphatic radicals of the formula $C_nH_{2n}$ wherein $n$ is an integer from 2 to 18, and divalent cyclohexane group; and X and X' are $-COOR^2$ radicals wherein $R^2$ designates a member of the class consisting of hydrogen and the alkyl radicals having one to fourteen carbon atoms; and (b) a member of the class consisting of the alkanediols of the structure

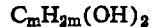

where $m$ is an integer from 2 to 10 and the polyoxyalkylene diols of the structure

where $R^3$ is of the class consisting of hydrogen and the methyl radical, and $p$ is an integer from 1 to 3, the said diol and spirobi-(meta-dioxane) compound being reacted in the range of molar ratios of from 1:1 to 5:1, said diol having a boiling point higher than that of by-product $R^2OH$, removing the by-product $R^2OH$ as it is formed, and continuing the heating until substantially all formation and evolution of the $R^2OH$ has ceased; and (2) treating said intermediate polymer condensate at a temperature within the range between about 60° C. and 100° C. with between about 5 percent and 100 percent by weight of water and with between about 0.8 percent and 27 percent by weight of formaldehyde, based on the weight of intermediate polymer condensate, in the presence of a catalytic quantity of acid for a period of time between about one and six hours.

2. A process for the production of resinous polyesters which comprises (1) forming an intermediate polyester condensate by heating and condensing at a temperature within the range between about 125° C. and 225° C. in an inert atmosphere a mixture comprising (a) a spirobi(meta-dioxane) compound having the structure

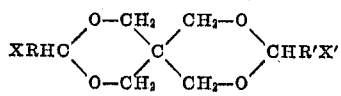

wherein R and R' designate members of the class consisting of the divalent aliphatic radicals of the formula $C_nH_{2n}$ wherein $n$ is an integer from 2 to 18, and divalent cyclohexane group; and X and X' are $-COOR^2$ radicals wherein $R^2$ designates a member of the class consisting of hydrogen and the alkyl radicals having one to fourteen carbon atoms; and (b) a member of the class consisting of the alkanediols of the structure $C_mH_{2m}(OH)_2$ where $m$ is an integer from 2 to 10 and the polyoxyalkylene diols of the structure

where $R^3$ is of the class consisting of hydrogen and the methyl radical, and $p$ is an integer from 1 to 3, the said diol and spirobi(meta-dioxane) compound being reacted in the range of molar ratios of from 1:1 to 5:1, said diol having a boiling point higher than that of by-product $R^2OH$, removing the by-product $R^2OH$ as it is formed, and continuing the heating until substantially all formation and evolution of the $R^2OH$ has ceased; and (2) treating said intermediate polyester condensate with between about 5 percent and 100 percent by weight of water, between about 0.8 percent and 27 percent by weight of formaldehyde and between about 0.01 percent and 2.0 percent by weight of acid catalyst, based on the weight of intermediate polyester condensate, at a temperature 3. A process for the production of resinous polyesters which comprises (1) forming an intermediate polyester condensate by heating and condensing at a temperature within the range between about 125° C. and 225° C. in an inert atmosphere a mixture comprising (a) a spirobi-(meta-dioxane) compound having the structure

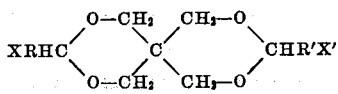

wherein R and R' designate members of the class consisting of the divalent aliphatic radicals of the formula $C_nH_{2n}$ wherein $n$ is an integer from 2 to 18, and divalent cyclohexane group; and X and X' are —$COOR^2$ radicals wherein $R^2$ designates a member of the class consisting of hydrogen and the alkyl radicals having one to fourteen carbon atoms; and (b) an alkanediol having two to ten carbon atoms and having two primary hydroxyl radicals, the said diol and spirobi(meta-dioxane) compound being reacted in a molar ratio within the range from 1:1 to 5:1, said diol having a boiling point higher than that of by-product $R^2OH$, removing the by-product $R^2OH$ as it is formed, and continuing the heating until substantially all formation and evolution of the $R^2OH$ has ceased; and (2) treating said intermediate polyester condensate with between about 5 percent and 100 percent by weight of water, between about 0.8 percent and 27 percent by weight of formaldehyde and between about 0.01 percent and 2.0 percent by weight of acid catalyst, based on the weight of intermediate polyester condensate, at a temperature within the range between about 60° C. and 100° C. until a homogeneous solution is formed.

4. A process for the production of resinous polyesters which comprises (1) forming an intermediate polyester condensate by heating and condensing at a temperature within the range between about 125° C. and 225° C. in an inert atmosphere a mixture comprising (a) a spirobi-(meta-dioxane) compound having the structure

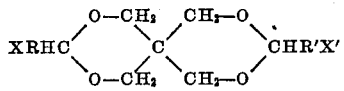

wherein R and R' designate member of the class consisting of the divalent aliphatic radicals of the formula $C_nH_{2n}$ wherein $n$ is an integer from 2 to 18, and divalent cyclohexane group; and X and X' are —$COOR^2$ radicals wherein $R^2$ designates a member of the class consisting of hydrogen and the alkyl radicals having one to fourteen carbon atoms; and (b) an alkanediol having two to ten carbon atoms and having two secondary hydroxyl radicals, the said diol and spirobi(meta-dioxane) compound being reacted in a molar ratio within the range from 1:1 to 5:1, said diol having a boiling point higher than that of by-product $R^2OH$, removing the by-product $R^2OH$ as it is formed, and continuing the heating until substantially all formation and evolution of the $R^2OH$ has ceased; and (2) treating said intermediate polyester condensate with between about 5 percent and 100 percent by weight of water, between about 0.8 percent and 27 percent by weight of formaldehyde and between about 0.01 percent and 2.0 percent by weight of acid catalyst, based on the weight of intermediate polyester condensate, at a temperature within the range between about 60° C. and 100° C. until a homogeneous solution is formed.

5. A process for the production of resinous polyesters which comprises (1) forming an intermediate polyester condensate by heating and condensing at a temperature within the range between about 125° C. and 225° C. in an insert atmosphere a mixture comprising (a) a spirobi-(meta-dioxane) compound having the structure

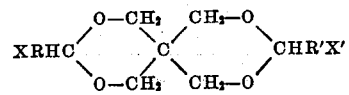

wherein R and R' designate members of the class consisting of the divalent aliphatic radicals of the formula $C_nH_{2n}$ wherein $n$ is an integer from 2 to 18, and divalent cyclohexane group; and X and X' are the —$COOR^2$ radicals wherein $R^2$ designates a member of the class consisting of hydrogen and the alkyl radicals having one to fourteen carbon atoms; and (b) an alkanediol having two to ten carbon atoms and having one primary and one secondary hydroxyl radical, the said diol and spirobi-(meta-dioxane) compound being reacted in a molar ratio within the range from 1:1 to 5:1, said diol having a boiling point higher than that of by-product $R^2OH$, removing the by-product $R^2OH$ as it is formed, and continuing the heating until substantially all formation and evolution of the $R^2OH$ has ceased; and (2) treating said intermediate polyester condensate with between about 5 percent and 100 percent by weight of water, between about 0.8 percent and 27 percent by weight of formaldehyde and between about 0.01 percent and 2.0 percent by weight of acid catalyst, based on the weight of intermediate polyester condensate, at a temperature within the range between about 60° C. and 100° C. until a homogeneous solution is formed.

6. A process for the production of resinous polyesters which comprises (1) forming an intermediate polyester condensate by heating and condensing at a temperature within the range between about 125° C. and 225° C. in an inert atmosphere a mixture comprising (a) a spirobi-(meta-dioxane) compound having the structure

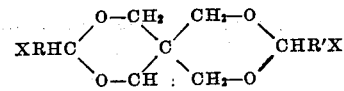

wherein R and R' designate members of the class consisting of the divalent aliphatic radicals of formula $C_nH_{2n}$ wherein $n$ an integer from 2 to 18, and the divalent cyclohexane group; and X and X' are —$COOR^2$ radicals wherein $R^2$ designates a member of the class consisting of hydrogen and the alkyl radicals having one to fourteen carbon atoms; and (b) ethylene glycol, said ethylene glycol and spirobi(meta-dioxane) compound being reacted in the range of molar ratios of from 1:1 to 5:1, said ethylene glycol having a boiling point higher than that of by-product $R^2OH$, removing the by-product $R^2OH$ as it is formed, and continuing the heating until substantially all formation and evolution of the $R^2OH$ has ceased; and (2) treating said intermediate polyester condensate at a temperature within the range between about 60° C. and 100° C. with between about 5 percent and 15 percent by weight of water and between about 0.8 percent and 27 percent by weight of formaldehyde, based on the weight of intermediate polyester condensate, in the presence of a catalytic quantity of acid for a period of time between about one and six hours.

7. A resinous polyester produced by the process of claim 1.

8. The process of claim 1 with additional steps to improve the solvent resistance of the resinous polyesters produced which comprise shaping the resultant reaction product into an article that is relatively thin in at least one of its dimensions, and heating the thus shaped article to a temperature between aobut 125° C. and 275° C.

9. A process for the production of resinous polyesters which comprises (1) forming an intermediate polyester condensate by heating and condensing at a temperature within the range between about 125° C. and 225° C. in an inert atmosphere a mixture comprising (a) a spirobi-(meta-dioxane) compound having the structure

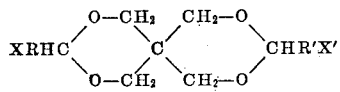

wherein R and R' designate members of the class consisting of the divalent aliphatic radicals of the formula $C_nH_{2n}$ wherein $n$ is an integer from 2 to 18, and divalent cyclohexane group; and X and X' are —$COOR^2$ radicals wherein $R^2$ designates a member of the class consisting of hydrogen and the alkyl radicals having one to fourteen carbon atoms; and (b) ethylene glycol, said ethylene glycol and spirobi(meta-dioxane) compound being reacted in the range of molar ratios of from 1:1 to 5:1, said ethylene glycol having a boiling point higher than that of by-product $R^2OH$, removing the by-product $R^2OH$ as it is formed, and continuing the heating until substantially all formation and evolution of the $R^2OH$ has ceased; and (2) treating said intermediate polyester condensate with between about 5 percent and 15 percent by weight of water, between about 0.8 percent and 27 percent by weight of formaldehyde and between about 0.01 percent and 2.0 percent by weight of acid catalyst, based on the weight of intermediate polyester condensate, at a temperature within the range between about 60° C. and 100° C. until a homogeneous solution is formed.

10. A resinous polyester in the form of a shaped article that is relatively thin in at least one of its dimensions, and produced by the process of claim 8.

References Cited in the file of this patent

UNITED STATES PATENTS

| | | |
|---|---|---|
| 2,785,996 | Kress | Mar. 19, 1957 |
| 2,857,363 | Easley et al. | Oct. 21, 1958 |
| 2,915,492 | Wilson et al. | Dec. 1, 1959 |

UNITED STATES PATENT OFFICE
CERTIFICATION OF CORRECTION

Patent No. 3,020,263                      February 6, 1962

Talmage D. Foster, Jr.

It is hereby certified that error appears in the above numbered patent requiring correction and that the said Letters Patent should read as corrected below.

Column 2, lines 4 to 7, the formula should appear as shown below instead of as in the patent:

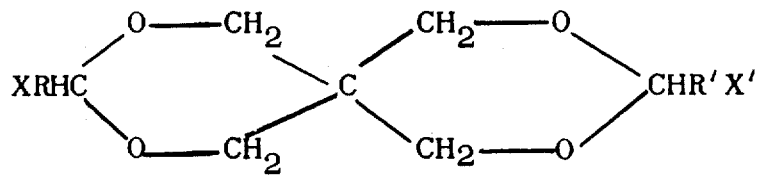

Signed and sealed this 16th day of October 1962.

(SEAL)
Attest:

ERNEST W. SWIDER                      DAVID L. LADD

Attesting Officer                      Commissioner of Patents